United States Patent
Tsuyuki et al.

(10) Patent No.: US 6,826,056 B2
(45) Date of Patent: Nov. 30, 2004

(54) SYSTEMS FOR USE WITH DATA STORAGE DEVICES

(75) Inventors: Brian S. Tsuyuki, Roseville, CA (US); Pete Capano, Boise, ID (US); Darrel W. Poulter, Middleton, ID (US); Herbert J. Tanzer, Folsom, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2 days.

(21) Appl. No.: 10/455,114

(22) Filed: Jun. 4, 2003

(65) Prior Publication Data

US 2003/0206402 A1 Nov. 6, 2003

Related U.S. Application Data

(63) Continuation of application No. 10/014,077, filed on Dec. 11, 2001, now abandoned.

(51) Int. Cl.[7] ............................................... G06F 1/16
(52) U.S. Cl. ..................... 361/725; 361/727; 361/752; 361/685; 312/223.2; 248/638
(58) Field of Search ............................. 361/684–685, 361/724–727, 747, 756, 758, 759, 799–802, 773–774, 818; 312/223.1, 223.2, 265.6, 257.1; 248/682, 694; 292/102, 106, 175, 203, 207, 341.15

(56) References Cited

U.S. PATENT DOCUMENTS

| | | | | |
|---|---|---|---|---|
| 5,490,723 A | * | 2/1996 | Driscoll et al. | 312/334.28 |
| 6,058,016 A | * | 5/2000 | Anderson et al. | 361/727 |
| 6,154,361 A | * | 11/2000 | Anderson et al. | 361/685 |
| 6,325,353 B1 | * | 12/2001 | Jiang | 248/682 |
| 6,371,433 B2 | * | 4/2002 | Anderson et al. | 248/562 |
| 6,378,965 B1 | * | 4/2002 | Reznikov et al. | 312/332.1 |
| 6,424,523 B1 | * | 7/2002 | Curtis et al. | 361/685 |
| 6,480,391 B1 | * | 11/2002 | Monson et al. | 361/752 |

* cited by examiner

Primary Examiner—Michael Datskovsky (57) ABSTRACT

Systems for mounting data storage devices to a chassises are provided. A representative system includes a filler carrier that incorporates a bezel. The bezel including a first snap configured to move between a latched position and an unlatched position. In the latched position, the snap facilitates secure mounting of the filler carrier to a chassis by forming an interference fit with the chassis. In the unlatched position, the snap facilitates removal of the filler carrier from the chassis. The bezel of the filler carrier can be formed as a monolithic structure. Other systems and devices also are provided.

21 Claims, 9 Drawing Sheets

SYSTEMS FOR USE WITH DATA STORAGE DEVICES

CROSS REFERENCE TO RELATED APPLICATION(S)

This is a continuation of application Ser. No. 10/014,077 filed on Dec. 11, 2001, now abandoned which is hereby incorporated by reference herein.

BACKGROUND OF THE INVENTION

1. Field of the Invention

The present invention generally relates to data storage components. More specifically, the invention relates to systems that involve the use of data storage devices, such as disk drives, for example.

2. Description of the Related Art

Numerous storage medium carriers, such as disk drive carriers, for example, exist in the computer industry. Typically, each of these carriers is configured to mount an associated disk drive to an enclosure, such as a server product. As is known, an enclosure can mount multiple storage medium carriers. However, at any given time, one or more of the locations designated for mounting a storage medium carrier may be vacant. That is, such an enclosure may contain less than a complete complement of storage medium carriers. This can be problematic for several reasons. For example, enclosures that facilitate hot-swapping of storage medium carriers typically use the storage medium carriers to form a portion of the outer periphery of the enclosure-carrier assembly. In particular, the front faces of the storage medium carriers are exposed about the exterior of the enclosure. Therefore, when a location, e.g., a cage slot, for receiving such a storage medium carrier is vacant, the aesthetic appearance of the enclosure-carrier assembly can be less than desirable.

Additionally, the opening created in the enclosure-carrier assembly by the absence of a storage medium carrier can degrade the proper flow of air into an/or out of the enclosure-carrier assembly. This can result in reduced cooling of the storage medium carriers mounted to the enclosure. Therefore, it should be appreciated that there is a need for improved systems, devices and/or methods that address these and/or other shortcomings of the prior art.

SUMMARY OF THE INVENTION

Briefly described, the present invention relates to systems that involve the use of data storage devices, each of which is adapted to mount to a chassis. Typically, such a chassis defines multiple cage slots, with each of the cage slots being adapted to receive a data storage device. In this regard, a representative system includes a filler carrier that lacks a data storage device. The filler carrier incorporates a bezel that has a first snap configured to move between a latched position and an unlatched position. In the latched position, the snap facilitates secure mounting of the filler carrier to a chassis by forming an interference fit with the chassis. In the unlatched position, the snap facilitates removal of the filler carrier from the chassis.

A representative data storage system includes a chassis that is configured to mount at least one data storage device. A filler carrier that lacks a data storage device also is included. The filler carrier incorporates a bezel, which includes a first snap that is configured to move between a latched position and an unlatched position. In the latched position, the snap facilitates secure mounting of the filler carrier to a chassis by forming an interference fit with the chassis. In the unlatched position, the snap facilitates removal of the filler carrier from the chassis.

Other features and advantages of the present invention will become apparent to one with skill in the art upon examination of the following drawings and detailed description. It is intended that all such features and advantages be included herein within the scope of the present invention, as defined in the appended claims.

BRIEF DESCRIPTION OF THE DRAWINGS

The present invention, as defined in the claims, can be better understood with reference to the following drawings. The drawings are not necessarily to scale, emphasis instead being placed on clearly illustrating the principles of the present invention.

DETAILED DESCRIPTION

As described in greater detail hereinafter, filler carriers of the present invention can improve the cooling characteristics of storage medium enclosures that contain less than a complete complement of storage media. More specifically, such a filler carrier preferably is able to fill a void or slot that typically is exhibited when a storage medium carrier is removed from a slot of an enclosure. In this manner, the filler carrier tends to permit air to flow into and/or out of the enclosure in a manner at least somewhat similar to the airflow exhibited when a storage medium carrier is present in that slot. Additionally, such a filler carrier can improve the aesthetic appearance of such enclosures. In particular, in some embodiments, the filler carrier can exhibit structural features that are at least reminiscent of corresponding features of a storage medium carrier.

Figure 1:
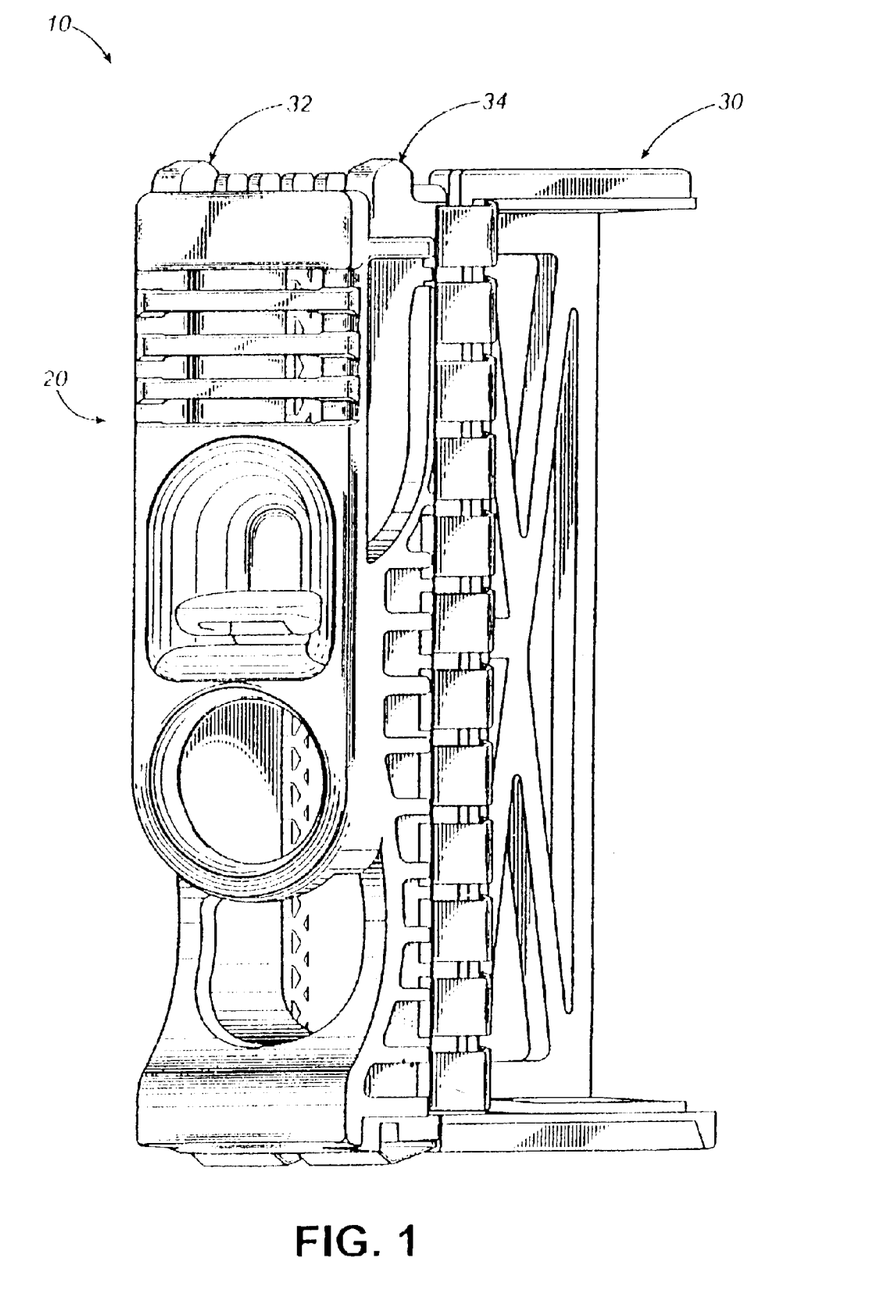
FIG. 1 is a perspective view of an embodiment of a filler carrier of the present invention.

Reference will now be made to the drawings, wherein like numerals indicate corresponding components throughout the several views. As shown in FIG. 1, an embodiment of the filler carrier 10 of the present invention includes a bezel 20 and frame 30. The filler carrier is sized and shaped to be received within a corresponding slot of a storage medium enclosure (not shown in FIG. 1). In order to secure the filler carrier within such a slot, the bezel includes snaps 32 and 34 for forming an interference fit with the enclosure.

Figure 2:
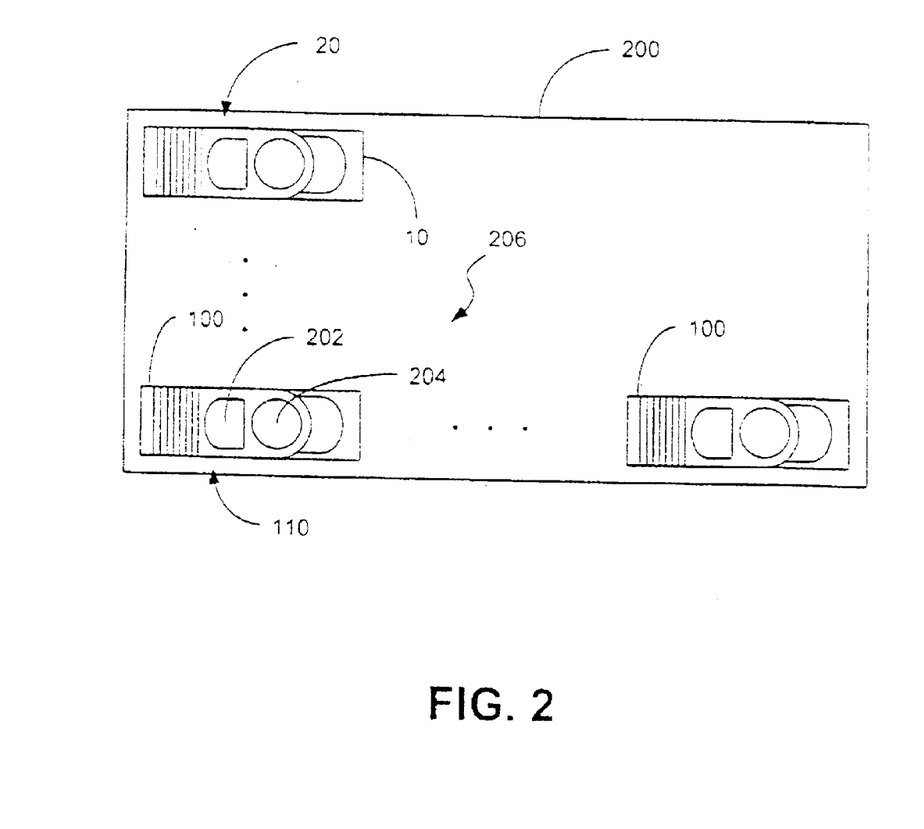
FIG. 2 is a schematic diagram depicting the filler carrier of FIG. 1 and representative storage medium carriers mounted to a representative chassis in a horizontal orientation.

A representative enclosure 200 is depicted schematically in FIG. 2. Enclosure 200 may facilitate mounting of one or more filler carriers 10 as well as one or more storage medium carriers ("carriers") 100. Typically, mounting of a filler carrier 10 or carrier 100 within enclosure 200 is facilitated by manual insertion into an appropriate slot, for example. In regard to a carrier 100, insertion and/or removal of the carrier from the appropriate slot may be accomplished without removing power from the carrier, as will be described in detail below. This procedure, commonly referred to as "hot swap," provides a technician with added flexibility as various other slots, and associated data storage device of the slots, do not have to be taken out of service during installation and/or removal of the carrier of interest.

As shown in FIG. 2, some embodiments of filler carrier 10 and carrier 100 are provided in a "right-handed" configuration. As utilized herein, the term "right-handed configuration" refers to a configuration that enables a user to conveniently grasp bezel 20, in the case of the filler carrier, or handle 110, in the case of the storage medium carrier 100, with the user's right hand. This configuration typically is consistent with preferred user-handling.

In regard to carrier 100, the right-handed configuration typically includes providing a bezel opening 202, which is adapted to receive the thumb of the user's right hand, and an opening 204 of the handle, which is adapted to receive another finger of the user's right hand, e.g., an index finger. Preferably, opening 204 is oriented to the right of the bezel opening when the carrier 100 is in a horizontal position, i.e., when PCA cover 104 is in a substantially horizontal plane and is disposed at the bottom side of the carrier. A similar arrangement of openings can be exhibited by the filler carrier.

Figure 3:
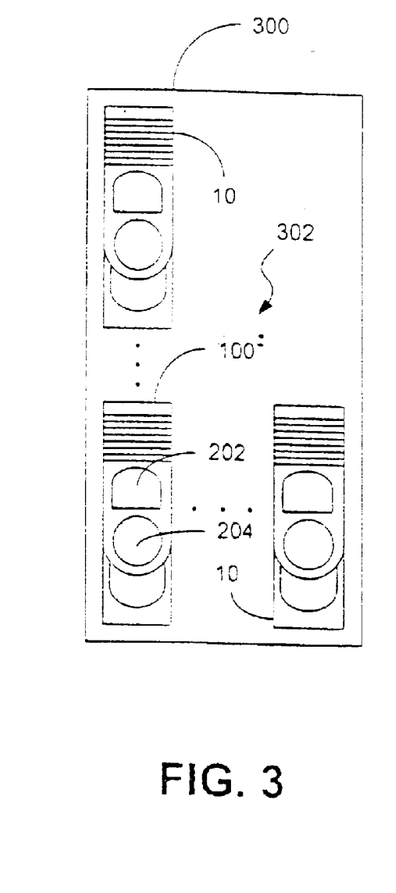
FIG. 3 is a schematic diagram depicting the filler carrier of FIG. 1 and representative storage medium carriers mounted to a representative chassis in a vertical orientation.

As shown in FIG. 2, filler carrier(s) 10 and carrier(s) 100 can be arranged in a horizontal mounting position, e.g., position 206. When a carrier 100 is mounted in the horizontal mounting position, the PCA cover 104 generally faces down. In FIG. 3, an alternative enclosure 300 is schematically depicted. Enclosure 300 is configured to receive one or more filler carriers 10 and/or one or more carriers 100 that are arranged in vertical mounting positions, e.g., position 302. When mounted in the vertical mounting position, bezel opening 202 typically is oriented above opening 204.

Figure 4:
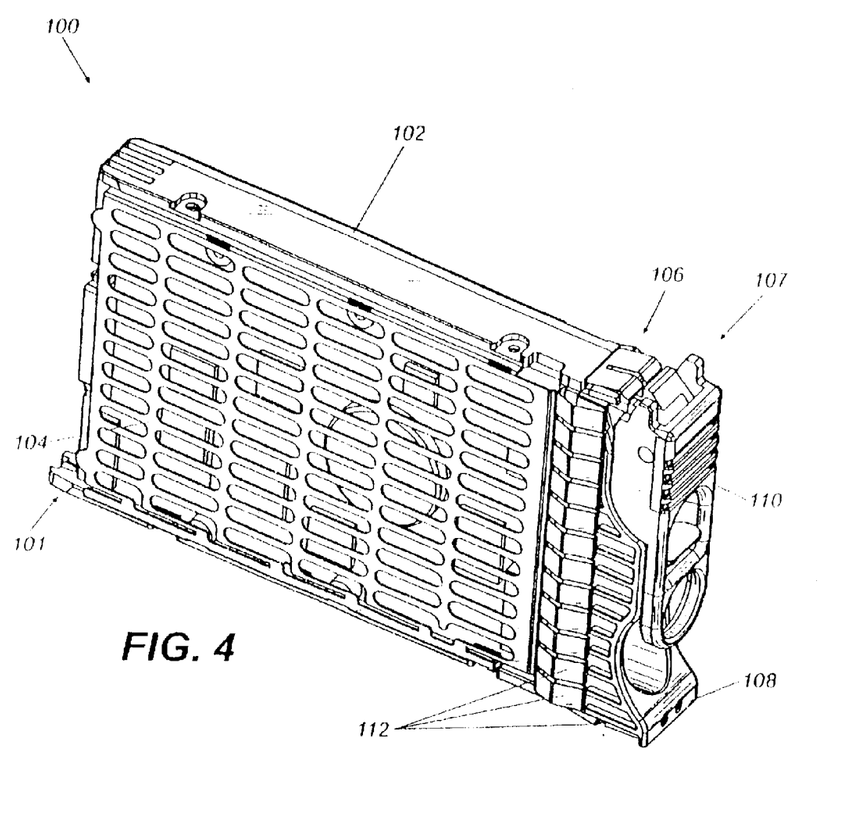
FIG. 4 is a perspective view of an embodiment of a storage medium carrier of the present invention.

As shown in FIG. 4, an embodiment of the storage medium carrier 100 of the present invention is configured as a module that is adapted for protecting and/or facilitating mounting of a data storage device, such as a disk drive, for example. The carrier can facilitate mounting of a data storage device to a chassis, which can be configured as an enclosure, a server product, a disk array, etc. Additionally, embodiments of the carrier 100 can be adapted to meet performance requirements of 1" low-profile, 3.5" form factor disk drives, for example. Of course, the carrier also can be adapted to meet various other criteria as would be apparent to one of ordinary skill in the art. An embodiment of a carrier 100 will now be described with reference to FIG. 4.

The representative embodiment of the carrier 100 depicted in FIG. 4 includes a housing 101, which incorporates a carrier frame 102 and a protective circuit assembly (PCA) cover 104. Frame 102 is sized and shaped for receiving and mounting a data storage device. As used herein, the term "data storage device" refers to any device that is capable of storing data, such as a disk drive, CD ROM, or an atomic resolution storage device, among others. At least partial encasement of such a data storage device within carrier 100 is facilitated by PCA cover 104. PCA cover 104 is adapted to mate with the carrier frame 102. Once so mated, carrier frame 102, PCA cover 104, and a corresponding data storage device cooperate so as to provide a protective enclosure for more sensitive components of the data storage device, such as storage device circuit assembly (not shown). For example, and not for the purpose of limitation, the storage device circuit assembly may be positioned between the PCA cover 104 and an opposing exterior surface of the data storage device.

In addition to providing a protective enclosure for at least a portion of an associated data storage device, in some embodiments, PCA cover 104 can function as a heat sink for the data storage device. In these embodiments, the PCA cover can be formed of a material such as aluminum, for example.

As shown in the embodiment of FIG. 4, carrier 100 includes an EMI shield 106, and a handle assembly 107, which incorporates a carrier bezel 108 and a handle 110. In some embodiments, handle 110 provides the dual functionality of serving as a carrying handle, which may be utilized for repositioning the carrier, and a locking mechanism for facilitating secure mounting of the carrier to an appropriate chassis or other mounting device. Preferably, the EMI shield incorporates spring fingers 112, described in detail hereinafter.

Figure 5:
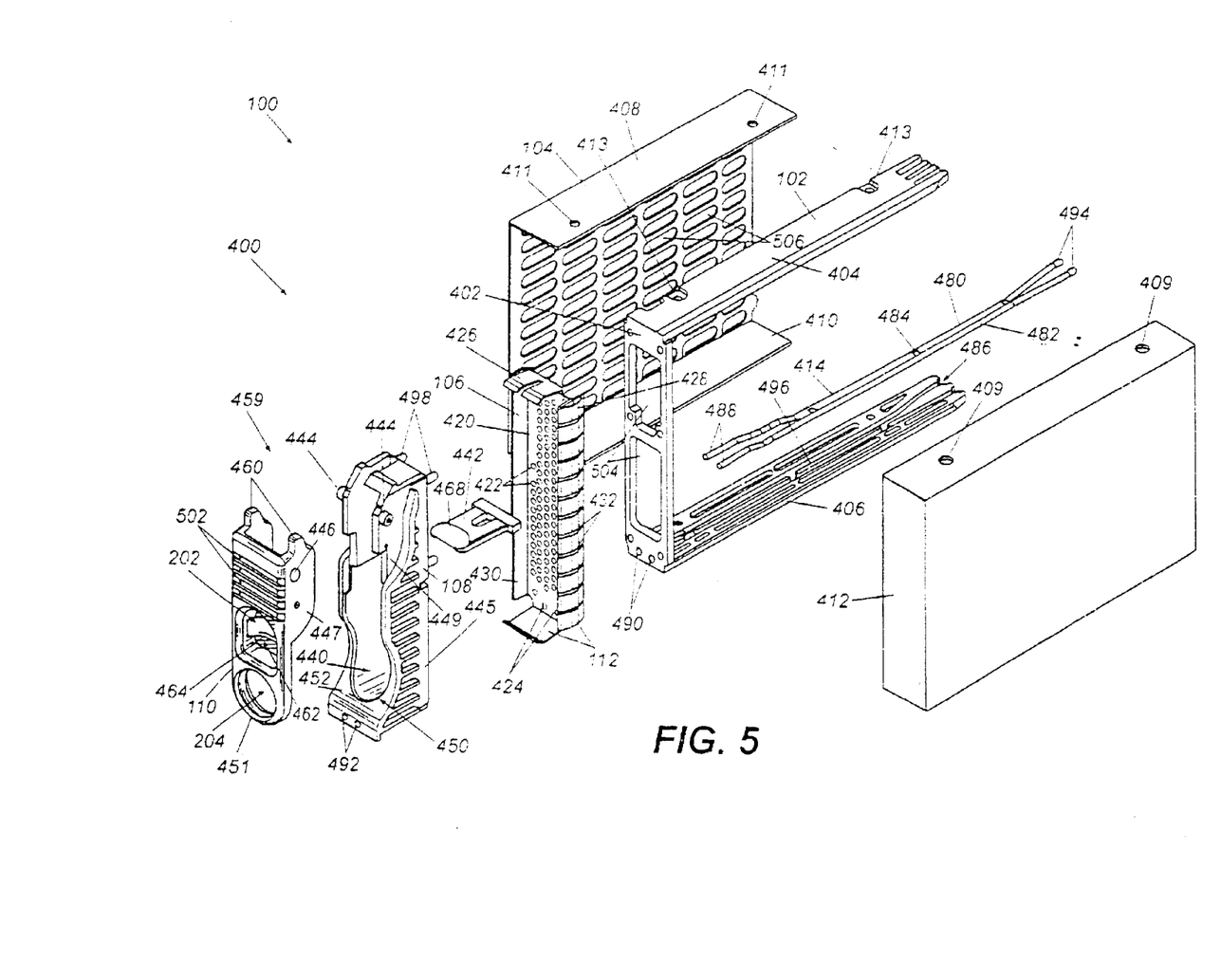
FIG. 5 is a partially-exploded, perspective view of an embodiment of a storage medium module of the present invention, which incorporates a disk drive and the embodiment of the carrier depicted in FIG. 4.

Reference will now be made to FIG. 5, which depicts preferred assembly detail of the embodiment of the carrier 100 depicted in FIG. 1. As shown in FIG. 5, carrier 100 includes frame 102, PCA cover 104, EMI shield 106, bezel 108, and cam handle 110. Frame 102 incorporates a face plate 402 and rails 404 and 406, which extend outwardly from face plate 402. Frame 102 is configured to receive PCA cover 104. By way of example, in the embodiment depicted in FIG. 5, sidewalls 408 and 410 of PCA cover 104 engage between rails 404 and 406, respectively, of frame 102. Sidewalls 408 and 410 are appropriately spaced to receive a data storage device, e.g., a disk drive 412. Thus, the data storage device is received at least partially between sidewalls 408 and 410.

Data storage device 412 and PCA cover 104 preferably are mounted to frame 102 by aligning mounting holes 409 of the data storage device, mounting holes 411 of PCA cover 104, and mounting holes 413 of frame 102. Mechanical fasteners (not shown) then are inserted through the aligned holes. In some embodiments, structural stability of the mounted data storage device 412 is enhanced by a snug fit of device 412 between the sidewalls of the PCA cover. Similarly, a snug fit of the sidewalls of the PCA cover between the rails of frame 102 also may enhance the structural stability of the module. The snug fit of the sidewalls of the PCA cover between the rails of the frame 102 also tends to be promoted by the mechanical fasteners, which draw the rails against the PCA cover as the fasteners are tightened.

Frame 102 is adapted to engage a lightpipe assembly 414, which will be described in detail hereinafter. Additionally, frame 102 and, more specifically, faceplate 402, is adapted to engage EMI shield 106. EMI shield 106 includes a body portion 420 that defines various apertures. In particular, an array of apertures 422 is provided, with the apertures 422 being sized and shaped to impede and/or prevent the propagation of electromagnetic energy from components arranged behind shield 106, e.g., data storage device 412. In some embodiments, apertures 422 each are configured with a hexagonal shape and also provide the function of enabling air to flow through the shield. This configuration tends to promote cooling of the data storage device 412. Body portion 420 also includes apertures 424 that are adapted to facilitate placement and/or viewing of lightpipe assembly 414.

Preferably, spring fingers 112 depend from body portion 420, such as along an outer periphery of the body portion. Various numbers and configurations of spring fingers 112 may be provided. All such numbers and configurations are considered well within the scope of the invention. The spring fingers preferably provide one or more of the following functions: (1) promoting structural stability to reduce externally and/or internally generated shock and/or vibration; (2) promoting electrical grounding continuity between carrier 100 and a component(s) to which it is mounted, and/or other carriers of such a component(s); and (3) enhancing EMI and/or ESD control of the carrier.

Various aspects of carrier/chassis systems are described in detail in co-pending U.S. patent application Ser. No. 09/809,409 (10012052-1, 50819-1490), entitled "Systems with Enhanced Electrostatic Discharge Protection," filed on Mar. 15, 2001, and co-pending U.S. Patent Application Serial No. to the Hewlett-Packard Company and is incorporated herein by reference in its entirety.

U.S. patent applications Ser. No. 09/896,478 (10011400-1, 50819-1110), entitled "Systems for Mounting Data Storage Devices," filed on Jun. 29, 2001; Ser. No. 09/970,189 (10011679-1, 50819-1420), entitled "Systems for Mounting Electronic Component Modules," filed Oct. 3, 2001; and Ser. No. 09/991,095 (10018387-1, 50830-1220), entitled "Systems with Pedestal Stands for Mounting Components," filed on Nov. 16, 2001. These applications are commonly assigned to the Hewlett-Packard Company and are incorporated herein by reference.

In FIG. 5, EMI shield 106 includes both forward-facing spring fingers 426 and rearward-facing spring fingers 428 (forward-facing generally referring to a direction away from data storage device 412, and rearward-facing generally referring to a direction toward device 412). Spring fingers 428 preferably extend from flanges 430, which, in combination with the forward-facing spring fingers 426, are adapted to extend about at least a portion of bezel 108.

EMI shield 106 is formed, at least partially, of an appropriate shielding material, such as stainless steel, among others. EMI shield 106 is formed of an appropriate thickness of material or otherwise is configured so as to provide suitable flexibility to one or more of the various spring fingers 112. So formed, the spring fingers preferably deflect in response to a displacement force, such as when engaging a corresponding portion of a chassis cage slot, for example. As the spring fingers tend to be biased to their non-displaced positions (shown in FIG. 5), this configuration enables the flexible spring fingers to serve as dampers for damping encountered shock and/or vibration of the carrier. The flexible configuration of the spring fingers also accommodates variable pitch arrangements of multiple carriers. Additionally, slots 432 formed between adjacent ones of the spring fingers may be appropriately sized and shaped for inhibiting propagation of electromagnetic energy beyond the material of the spring fingers.

The structure and accompanying functionality of bezel 108 and cam handle 110 will now be described. As shown in FIG. 5, bezel 108 defines an interior cavity 440 that is adapted to receive a thumb latch 442 (described hereinafter). Pivot bosses 444 are adapted to be received within corresponding pivot holes 446 of cam handle 110. Pivot bosses 444 preferably are provided on sidewalls 445 of the bezel, with pivot holes 446 preferably being formed through sidewalls 447 of the cam handle. Engagement of the bosses 444 within the holes 446 permits pivoting of cam handle 110 about the bosses 444 between an open or unlatched position (not shown) and a closed or latched position 501 (depicted in FIG. 6).

As shown in FIG. 5, each of bezel sidewalls 445 preferably incorporates a recessed portion 449 that is adapted to facilitate seating of the cam handle sidewalls 447 when the cam handle is in the latched position. In the embodiment depicted in FIG. 5, the surface defining each bezel sidewall recessed portion 449 extends to form a contoured profile of the bezel that provides appropriate clearance between the bezel and portions of the cam handle during pivoting of the cam handle. This feature also may be seen in FIG. 6, for example.

Bezel 108 preferably includes a recessed portion 450 that is adapted to provide clearance between the distal end 451 of the cam handle and the face 452 of the bezel. This recessed portion enables a finger of a user to be inserted between the distal end of the cam handle and the bezel so as to facilitate grasping and pivoting of the cam handle.

In order to facilitate mounting of carrier 100 into a corresponding chassis cage slot, for example, cam handle 110 incorporates a latching mechanism 459, which can be configured as one or more cam latches 460. In a preferred embodiment, dual cam latches 460 are provided, with each of the latches extending generally upwardly from a sidewall 447 of the cam handle. Cam latches 460 facilitate mounting of the carrier 100 by engaging a corresponding latching surface, such as representative latching surface 510, depicted in FIG. 6. Preferably, spacing of the cam latches from each other is sufficient to enable nesting of the cam latches about a rail of an adjacently disposed carrier. Thus, line-to-line stacking of carriers can be accommodated in some embodiments.

Figures 6, 7:
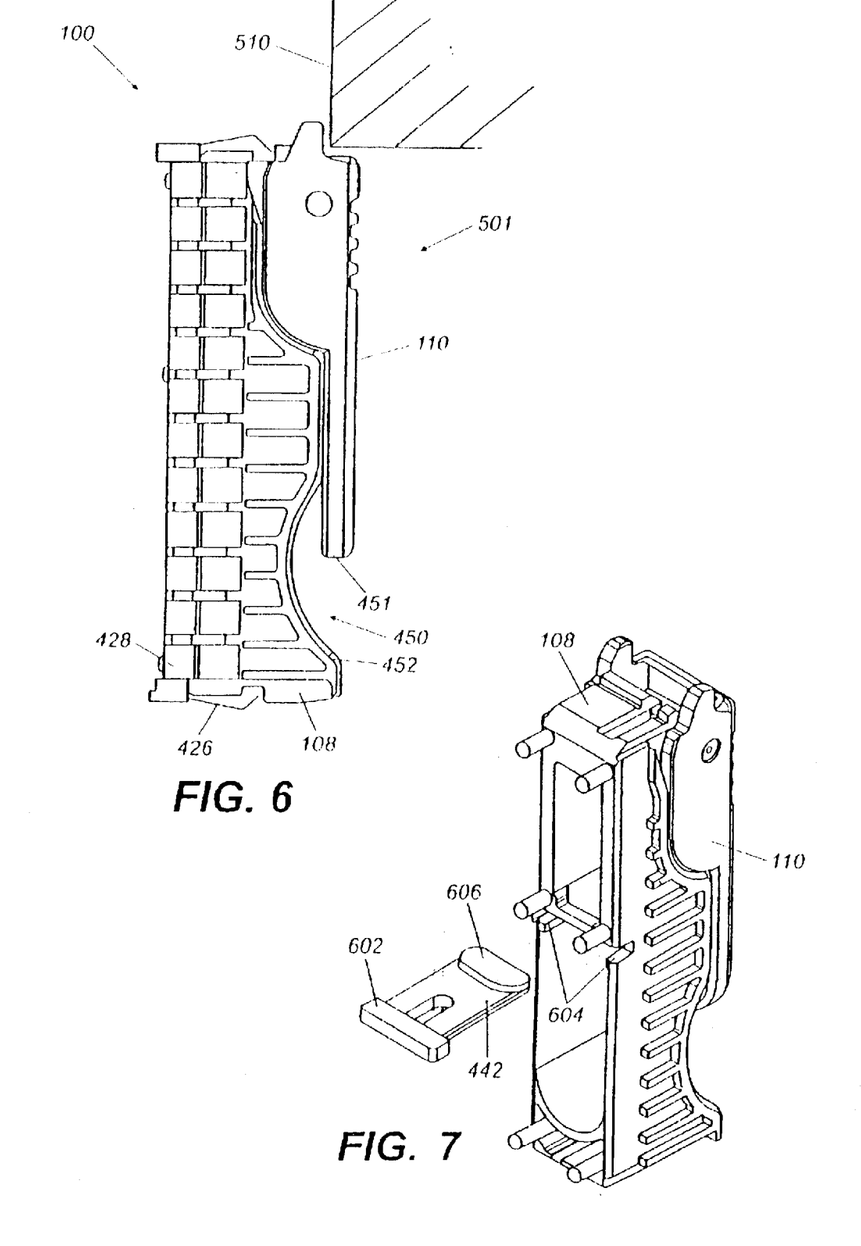
FIG. 6 is a cut-away, side view of the embodiment of the carrier depicted in FIG. 4.
FIG. 7 is a partially exploded, perspective, rear view of the bezel of the carrier depicted in FIG. 4, showing assembly detail of the thumb latch.

As mentioned hereinbefore, bezel 108 receives thumb latch 442. As depicted in FIG. 6, thumb latch 442 is received by bezel 108 by positioning base 602 of the latch within corresponding notches 604 of the bezel. Once so positioned, a protrusion 606 extends through bezel opening 440 and, thus, is appropriately positioned to be received within slot 462 of the cam handle (FIG. 5). In operation, as cam handle 110 is pivoted from the unlatched position to the latched position (depicted in FIG. 6), protrusion 606 is received within slot 462. Thereafter, further rotation of the cam handle toward the latched position causes protrusion 606 to be downwardly deflected until lip 464 of the cam handle extends beyond ledge 468 of the latching member. The downwardly deflected protrusion 606 returns to its unbiased position, thereby forming an interference fit between lip 464 and protrusion 606. The aforementioned interference fit tends to maintain the cam handle in the latched position.

Rotation of the cam handle from the latched position to the unlatched position preferably is facilitated by the user extending a thumb, for example, into opening 202 of the cam handle. The thumb then engages thumb latch 442 and downwardly deflects latching member 606 until the interference fit is disengaged. Thereafter, the cam handle may be rotated toward its unlatched position. This can be accomplished by the user inserting another finger, e.g., an index finger, into opening 204 and grasping the cam handle between the thumb and finger.

Various openings are provided within and through the carrier to promote cooling of a data storage device. For instance, cam handle 110 includes one or more louvers 502 that, in addition to the thumb opening 202 and finger opening 204, are adapted to permit air to flow through the handle. Once passing through the handle, air can flow through cavity 440 of the bezel, and then through the various apertures 422 of the EMI shield 106. After passing through the EMI shield, air can reach data storage device 412 by passing through one or more frame openings 504. Airflow toward and away from the data storage device also is provided by apertures 506 formed through the PCA cover 104. Various materials for promoting cooling of heat-producing components and/or protecting a user from such components may be utilized.

Lightpipe assembly 414 will now be described in greater detail. Lightpipe assembly 414 preferably includes two lightpipes, lightpipes 480 and 482, respectively, that are interconnected by one or more cross ties 484. It should be noted that various other numbers of lightpipes may be utilized in other embodiments, with all such numbers being considered well within the scope of the present invention.

The preferred configuration depicted in FIG. 5 enables lightpipe assembly 414 to be assembled during a single molding operation. In particular, lightpipe assembly 414 can be formed by pouring material into a suitable mold to form both lightpipes and their accompanying cross ties as a unitary structure.

Lightpipe assembly 414 is received within a channel arrangement (pocket) 486 that is formed within a rail of frame 102. Once received within pocket 486, viewing ends 488 of the lightpipes may be viewable and/or extend at least partially through holes 490 of frame 102, holes 424 of EMI shield 106, and holes 492 of bezel 108. So provided, status light information typically provided by one or more light emitting diodes (LEDs) associated with the cage slot of a chassis may be propagated to the user for viewing.

In order to increase the chance for light emitted from the aforementioned LEDs (not shown) to enter the lightpipes, light acceptance cones 494 may be provided at the LED ends of the lightpipes. As the cones have an increased cross-sectional surface area at their distal ends, as compared to the cross-sectional surface area of the cylindrical-shaped portions of the lightpipes, minor misalignment of the lightpipes with the LEDs of the cage slot may be accommodated. Thus, this configuration preferably enables a sufficient amount of light from the LEDs to be propagated through the lightpipes for viewing.

In order to keep lightpipe-to-lightpipe crosstalk to negligible visibility levels, an incident light separator 496 preferably is disposed within the pocket 486. Separator 496 forms a physical partition between the lightpipes that is able to reduce the tendency of and/or prevent incident light from propagating between the lightpipes. At locations where the separator is not present, such as at occurrences of cross ties 484, for example, crosstalk between the lightpipes can be reduced by providing the cross ties with a surface texture that promotes scattering of light. For instance, if the cross ties are configured with a non-smooth surface texture, light provided to the cross ties can tend to scatter and not propagate at full intensity from one lightpipe to the other via the cross ties.

Figure 8:
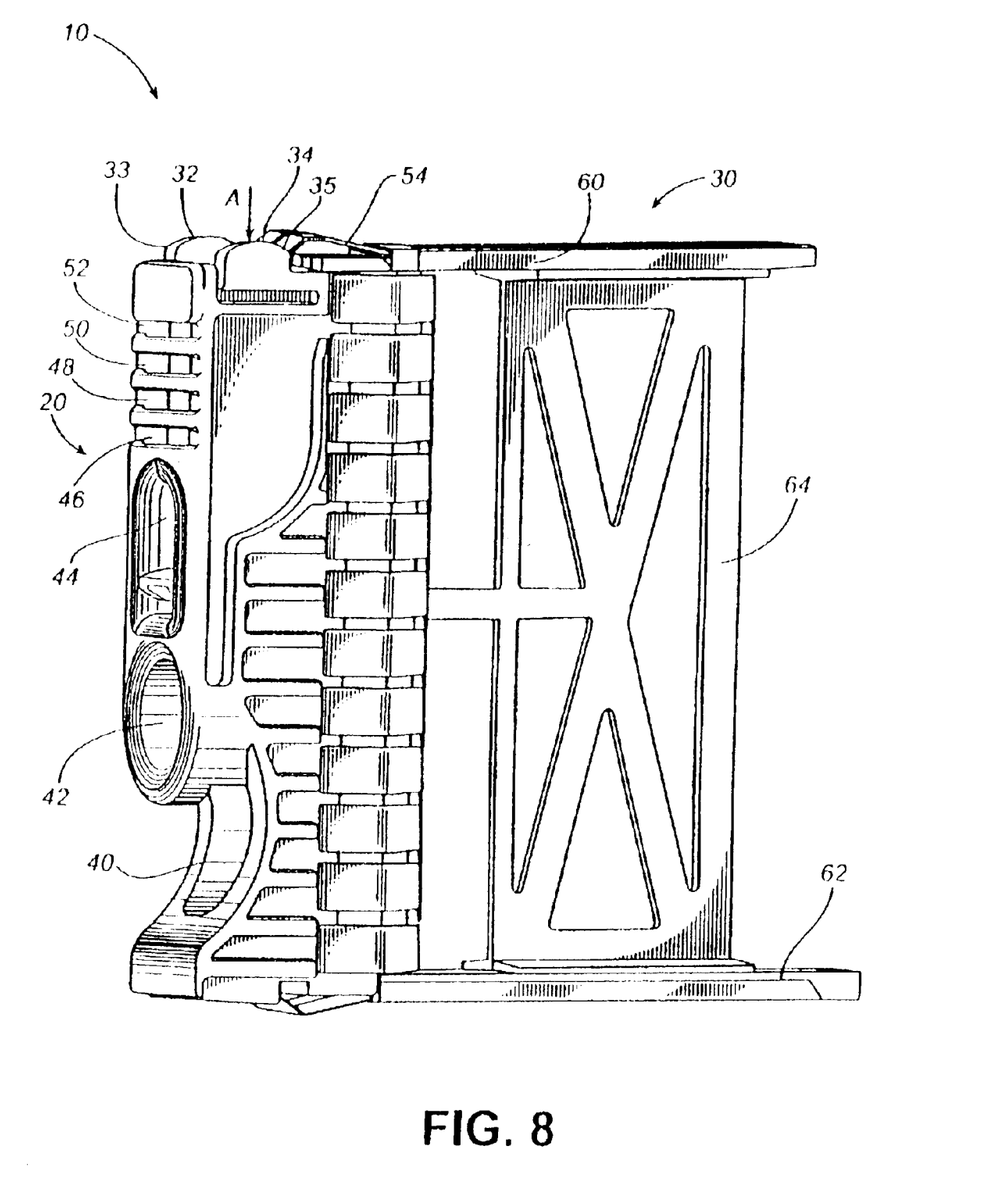
FIG. 8 is a perspective, side view of the filler carrier of FIG. 1.

Referring now to FIG. 8, an embodiment of a filler carrier 10 will now be described in greater detail. As depicted in FIG. 8, filler carrier 10 includes a bezel 20 that preferably exhibits at least some features similar to that described hereinbefore in relation to carrier 100. In particular, bezel 20 includes air flow orifices 40 through 52, each of which can be sized and shaped to appear like a corresponding feature described before in relation to carrier 100. These orifices permit air to flow into and out of a chassis, e.g., an enclosure, to which it is mounted. By way of example, air can enter through orifices (louvers) 46–52, flow through the bezel, e.g., through holes (not shown) formed through EMI shield 54, and then into the chassis slot of the enclosure.

By restricting the flow of air, such as through one or more of the orifices, an increased velocity of cooling air flow can be attained compared to a similar enclosure that does not use a filler carrier, i.e., compared to an enclosure that contains less than a complete complement of storage medium carriers mounted thereto. In this manner, an increase in the thermal cooling efficiency of storage media operating in association with the enclosure can be achieved.

Preferably, the various features of the bezel are integrally formed so as to provide a monolithic structure. This can be done to reduce manufacturing costs, particularly when the bezel is formed by a molding process. In such an embodiment, snaps 32 and 34 can be provided as cantilevered components. More specifically, the resilient nature of the material forming the bezel enables each of the snaps to depress inwardly, e.g., in direction A, to permit the filler carrier to be positioned within a corresponding cage slot. In some embodiments, the snaps (or other corresponding components for securing the filler carrier to a chassis) can be formed separately from the bezel.

In order to secure the filler carrier within the slot of a chassis, the frame of the filler carrier is aligned with the slot and then inserted therein until the snaps of the bezel engage a corresponding portion of the chassis. The snaps then can be urged to respective displaced (unlatched ) positions where an appropriate clearance is achieved between the filler carrier, e.g., the snaps, and the portions of the chassis defining the slot. Once appropriately positioned, continued movement of the filler carrier into the slot enables each snap to return to its non-displaced (latched) position (shown in FIG. 8) to form an interference fit with the chassis.

In order to promote convenient installation and removal of the filler carrier, each snap can include a rounded or, otherwise, inclined outer edge (33 and 35, respectively). This outer edge can engage a corresponding latching surface of the chassis and urge the snap inwardly as the force applied to the outer edge by the latching surface is redirected downwardly due to the inclined shape.

Embodiments of the filler carrier also can include an EMI shield. EMI shield 54 of a filler carrier can be identical to the EMI shield used in a carrier 100 (described hereinbefore). In particular, embodiments of the EMI shield 54 can include spring fingers that are constructed to engage adjacent spring fingers of another filler carrier, a carrier 100, or a corresponding portion of the chassis to which it is mounted.

Frame 30 engages bezel 20 and is used to support the bezel in a proper orientation relative to the enclosure. In the embodiment depicted in FIG. 8, frame 30 includes first and second rails 60 and 62, respectively, that extend outwardly from a rear of the bezel. Support beams 64 extend between the rails to enhance the rigidity of the frame. Clearly, various arrangements of rails and support beams can be used.

Figure 9:
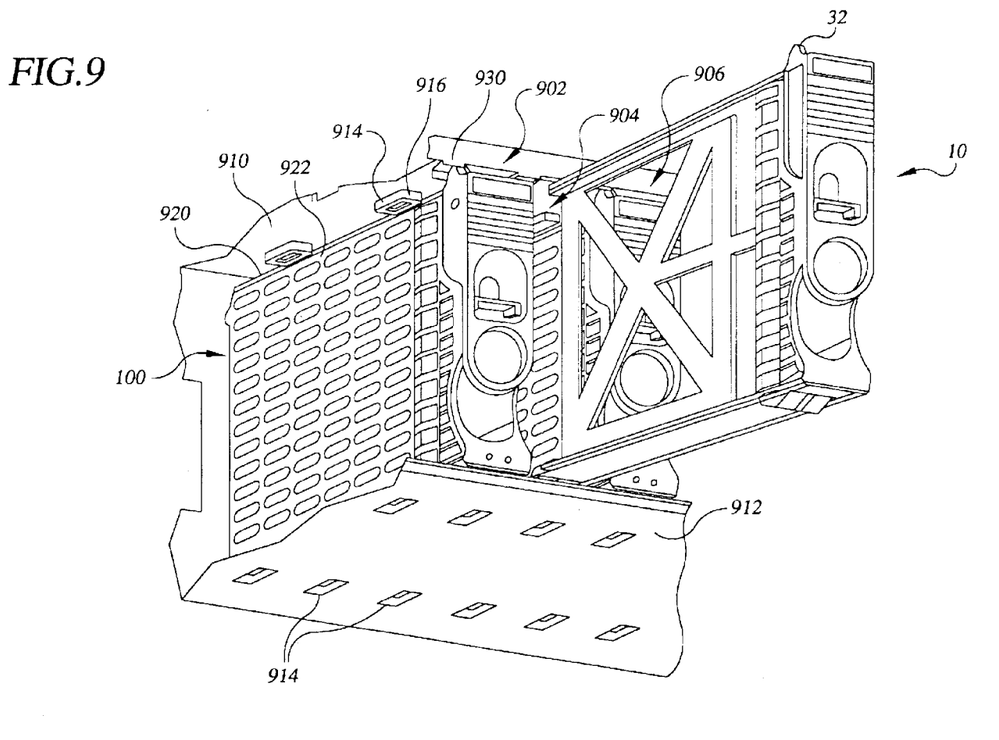
FIG. 9 is a cut-away, perspective view of an embodiment of a chassis of the present invention that is configured to mount one or more filler carriers and/or storage medium carriers in a vertical orientation.

Mounting of a filler carrier 10 to a representative chassis will be described will be described with reference to FIG. 9. In FIG. 9, chassis 900 defines multiple slots, e.g., slots 902, 904 and 906, each of which can accommodate a filler carrier 10 or carrier 100. The slots are defined, at least in part, by an upper wall 910 and a lower wall 912. The walls are spaced from each other at a distance that is sufficient to receive a carrier 100 and/or filler carrier 10. Protrusions 914, some of which extend downwardly from upper wall 910 while others extend upwardly from lower wall 912, can function as alignment guides for the carrier. More specifically, protrusions 914 can be configured to engage one or more surfaces of the carrier and tend to align the carrier with its slot as the carrier is slid into the slot. In the embodiment of FIG. 9, protrusions 914 include generally rounded, or otherwise sloped, front surfaces 916 that tend to deflect a mis-aligned carrier and/or filler carrier toward a proper mounting position. Note, Carriers 100A and 100B are depicted mounted within slots 902 and 906 in vertical mounting positions.

In order to mount the carrier 100 within slot 902, the handle preferably is pivoted to its unlatched position. The carrier is aligned with the slot and inserted rearwardly into the slot. The protrusions, which may be configured to engage various surfaces of a carrier, preferably engage reveal 920. Reveal 920 is defined where the upper portion 922 and lower portion (not shown) of the PCA cover 104 engage the frame rails. The protrusions 914 preferably align the carrier and permit the carrier to be slid into the chassis to a sufficient depth to enable the cam latches of the handle to pass beyond a latching surface provided by the chassis. In some embodiments, such a latching surface can be formed by a protrusion 930 arranged in the upper wall of the chassis. Once inserted to an appropriate depth, the handle can be pivoted to its latched position so that the cam latches engage the latching surface(s). This secures the carrier within the slot.

In order to mount the filler carrier 10 within slot 904, the filler carrier is aligned with the slot and inserted rearwardly into the slot. The protrusions 914 preferably align the filler carrier and permit the carrier to be slid into the chassis to a sufficient depth to enable the snaps to engage a latching surface provided by the chassis. In some embodiments, such a latching surface can be formed by a protrusion 930 arranged in the upper wall of the chassis. Once inserted to an appropriate depth, continued rearward movement of the filler carrier causes the snaps to deflect inwardly, thereby creating sufficient clearance for the snaps to be moved behind the latching surface. After clearing the latching surface, the snaps typically return to their unbiased positions to form an interference fit with the latching surface. This secures the filler carrier within the slot.

Figure 10:
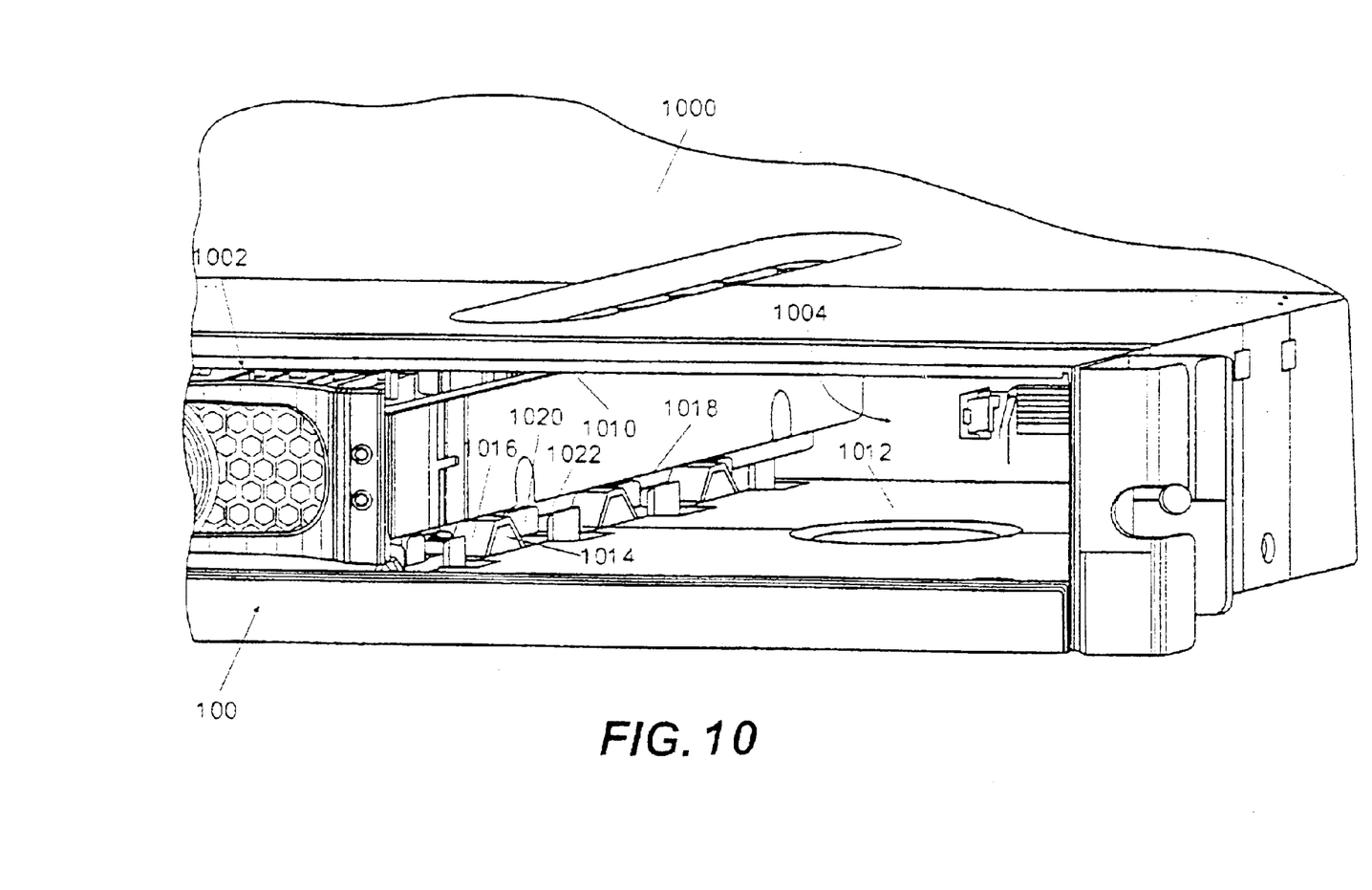
FIG. 10 is a cut-away, perspective view of an alternative embodiment of a chassis of the present invention that is configured to mount one or more filler carriers and/or storage medium carriers in a horizontal orientation.

In FIG. 10, a carrier 100 is shown mounted to another representative chassis. Chassis 1000 of FIG. 10 defines multiple slots, e.g., slots 1002 and 1004, each of which can accommodate a carrier 100. A carrier 100 is depicted mounted within slot 1002 in a horizontal mounting position. Slot 1002 is defined, at least in part, by an upper wall 1010 and a lower wall 1012. The walls are spaced from each other at a distance that is sufficient to receive a carrier 100 and/or filler carrier (not shown). Protrusions 1014, some of which can extend downwardly from upper wall 1010 while others extend upwardly from lower wall 1012, are configured to function as alignment guides for the carrier. More specifically, protrusions 1014 are configured to engage one or more surfaces of the carrier and tend to align the carrier with its slot as the carrier is slid into the slot. Protrusions 1014 can include generally rounded, or otherwise sloped, front surfaces 1016 that tend to deflect a mis-aligned carrier toward a proper mounting position. The protrusions, which may be configured to engage various surface of a carrier, preferably engage side edges of the rails, such as edge 1018 of rail 404.

Also provided are protrusions 1020, some of which can extend downwardly from upper wall 1010 while others extend upwardly from lower wall 1012. Protrusions 1020 are configured to function as supports for the carrier. These protrusions, which also may be configured to engage various surface of a carrier, preferably engage sides of the PCA cover, such as side 1022.

In order to mount the carrier within slot 1002, the handle preferably is pivoted to its unlatched position. The carrier then is aligned with the slot and inserted rearwardly into the slot. The protrusions 1014 and 1020 preferably align and support the carrier and permit the carrier to be slid into the chassis to a sufficient depth to enable the cam latches of the handle to pass beyond a latching surface provided by the chassis. In some embodiments, such a latching surface can be formed by a protrusion 1014 and/or a protrusion 1020. Once inserted to an appropriate depth, the handle can be pivoted to its latched position so that the cam latches engage the latching surface(s). This secures the carrier within its slot.

Figure 11:
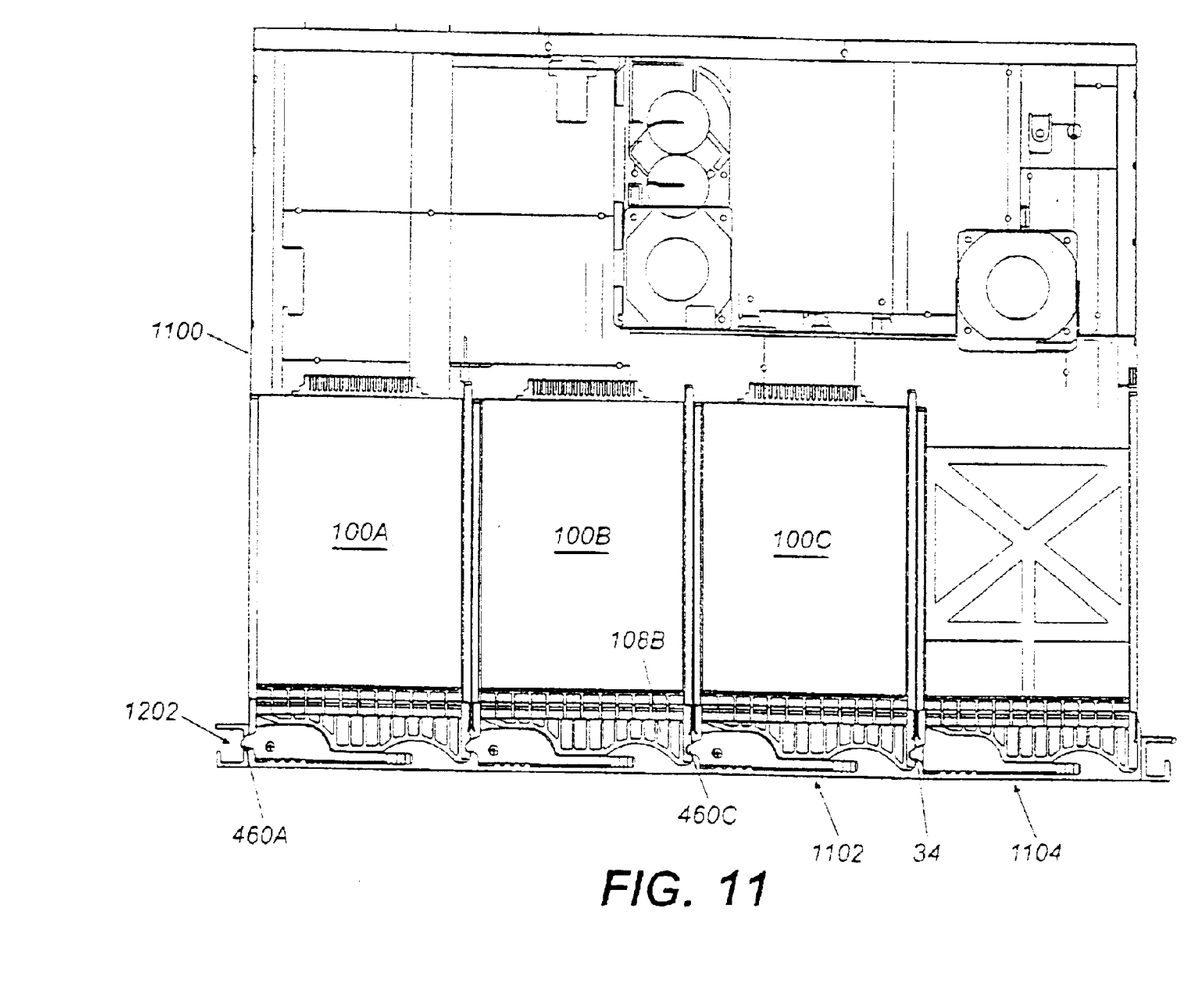
FIG. 11 is a cross-sectional, plan view of the chassis of FIG. 10.

As depicted in FIG. 11, multiple storage medium carriers, e.g., carriers 100A, 100B and 100C, and one or more filler carriers, e.g., filler carrier 10, can be arranged in a top-to-bottom relationship within a chassis. In order to facilitate a relatively high carrier density, cam latches of one carrier, e.g., carrier 100C, can be configured to engage about a portion of an adjacent carrier, e.g., carrier 100B. For example, cam latches 460C are spaced from each other so as to enable a portion of bezel 108B to be received between the cam latches. Note, the snaps, e.g., snap 34, of filler carrier 10 engages the carrier, e.g., carrier 100C, adjacent to it. Also depicted in FIG. 11 is aperture 1102, which is configured to receive cam latches of a carrier and/or snaps of a filler carrier.

The foregoing description has been presented for purposes of illustration and description. It is not intended to be exhaustive or to limit the invention to the precise forms disclosed. Modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A system for use with a data storage device adapted to mount to a chassis, the chassis defining multiple case slots, each of the cage slots being adapted to receive a data storage device, said system comprising:

a filler carrier having a bezel, said bezel including a first snap configured to move between a latched position and an unlatched position such that, in said latched position, said snap facilitates secure mounting of said filler carrier to a chassis by forming interference fit with the chassis and, in said unlatched position, said snap facilitates removal of said filler carrier from the chassis, said filler carrier lacking a data storage device;

wherein said filler carrier includes a frame and at least one beam, said frame extending from said bezel and being adapted to engage a chassis such that engagement of the chassis with said frame maintains an orientation of said filler carrier relative to the chassis when said filler carrier is mounted to said chassis, said at least one beam contacting said frame and being positioned to prevent mounting of a data storage device to said filler carrier.

2. The system of claim 1, wherein said bezel has a front, a rear and at least a first orifice formed therethrough such that air can flow through said at least one orifice from said front to said rear of said bezel.

3. The system of claim 2, wherein said filler carrier includes a shield at least partially disposed between said bezel and said frame, said shield being configured to inhibit propagation of electromagnetic energy directed from within the chassis to which said filler carrier is mounted toward said shield.

4. The system of claim 2, wherein said frame includes a first rial and a second rail spaced from said first rail, said first rail and said second rail being oriented substantially parallel to each other.

5. The system of claim 3, wherein said filler carrier has spring fingers arranged at least partially between said bezel and said frame, each of said spring fingers being configured as a flexible member, said spring fingers being spaced from each other and protruding about at least a portion of the periphery of said filler carrier, each of said spring fingers being configured to deflect from a non-displaced position in response to a displacement force such that said spring fingers tend to damp vibration encountered by said filler carrier.

6. The system of claim 5, wherein said spring fingers extend from said shield.

7. The system of claim 2, further comprising:

a data storage device carrier having a housing and a handle assembly, said housing being configured to receive at least a portion of a data storage device, said handle assembly having a handle configured to move between a latched position and an unlatched position such that, in said latched position, said handle facilitates secure mounting of said data storage device carrier to a chassis, and in said unlatched position, said handle facilitates removal of said data storage device carrier from the chassis.

8. The system of claim 7, wherein said data storage device carrier has a shield at least partially disposed between said housing and said handle assembly, said shield being configured to inhibit propagation of electromagnetic energy directed from the data storage device and toward said shield.

9. The system of claim 7, further comprising:

a data storage device mounted to said data storage device carrier.

10. A data storage system comprising:

a chassis configured to mount at least one data storage device; and a filler carrier having a bezel, said bezel including a first snap configure to move between a latched position and an unlatched position such that, in said latched position, said snap facilitates secure mounting of said filler carrier to said chassis by forming an interference fit with said chassis and, in said unlatched position, said first snap facilitates removal of said filler carrier from said chassis, said filler carrier lacking a data storage device, wherein said filler carrier includes a frame and at least one beam adapted to engage a chassis such that engagement of the chassis with said frame maintains an orientation of said filler carrier relative to the chassis when said filler carrier is mounted to said chassis, said at least one beam being positioned to prevent mounting of a data storage device to said filler carrier.

11. The system of claim 10, further comprising:

a data storage device carrier having a housing and a handle assembly, said housing being configured to receive at least a portion of a data storage device, said handle assembly having a handle configured to move between a latched position and an unlatched position such that, in said latched position, said handle facilitates secure mounting of said data storage device carrier to said chassis, and in said unlatched position, said handle facilitates removal of said data storage device carrier from said chassis.

12. The system of claim 11, further comprising:

means for inhibiting propagation of electromagnetic energy directed from the chassis.

13. The system of claim 11, wherein said means for inhibiting propagation of electromagnetic energy includes a first shield, said first shield engaging said bezel of said filler carrier.

14. The system of claim 11, wherein said means for inhibiting propagation of electromagnetic energy includes a second shield, said second shield engaging said housing of said data storage device carrier.

15. The system of claim 14, wherein said means for inhibiting propagation of electromagnetic energy includes spring fingers, each of said spring fingers being configured as a flexible member, a first set of said spring fingers being spaced from each other and protruding about at least a portion of the periphery of said filler carrier, a second set of said spring fingers being spaced from each other and protruding about at least a portion of the periphery of said data storage device carrier, at least some of said spring fingers of said first set being configured to engage at least some of said spring fingers of said second set.

16. The system of claim 11, further comprising:

a data storage device received at least partially within said housing of said data storage device carrier.

17. The system of claim 10, wherein said bezel includes a second snap spaced from said first snap, said second snap being configured to move between a latched position and an unlatched position such that, in said latched positions, each of said snaps facilitates secure mounting of said filler carrier to said chassis by forming an interference fit with said chassis and, in said unlatched positions, each of said snaps facilitates removal of said filler carrier from said chassis.

18. The system of claim 17, wherein said bezel is formed as a monolithic structure and said first and second snaps are formed as cantilevered portions of said bezel.

19. A system for use with a data storage device adapted to mount to a chassis, the chassis defining multiple cage slots, each of the cage slots being adapted to receive a data storage device, said system comprising:

a filler carrier having a bezel, said bezel including a first snap configure to move between a latched position and an unlatched position such that, in said latched position, said snap facilitates secure mounting of said filler carrier to a chassis by forming an interference fit with the chassis and, in said unlatched position, said snap facilitates removal of said filler carrier from the chassis, said filler carrier lacking a data storage device;

wherein said bezel has a top, a bottom, a first orifice, a second orifice and a third orifice, said first orifice being arranged adjacent to said top, said third orifice being arranged adjacent to said bottom, and said second orifice being arranged between said first orifice and said second orifice, said first orifice being sized and shaped to receive a thumb of a first hand of a user, said second orifice and said third orifice being sized and shaped to receive an index finger of the first hand of the user such that said filler carrier can be carried by the user inserting the thumb into said first orifice, extending the index finger into the third orifice and then extending the index finger outwardly through said second orifice.

20. The system of claim 4, wherein the at least one beam extends between the first rail and the second rail.

21. The system of claim 10, wherein the at least one beam extends between the first rail and the second rail.

* * * * *